No. 892,745. PATENTED JULY 7, 1908.
N. J. & F. L. LANOTTE.
PEANUT PLANTER.
APPLICATION FILED OCT. 29, 1907.
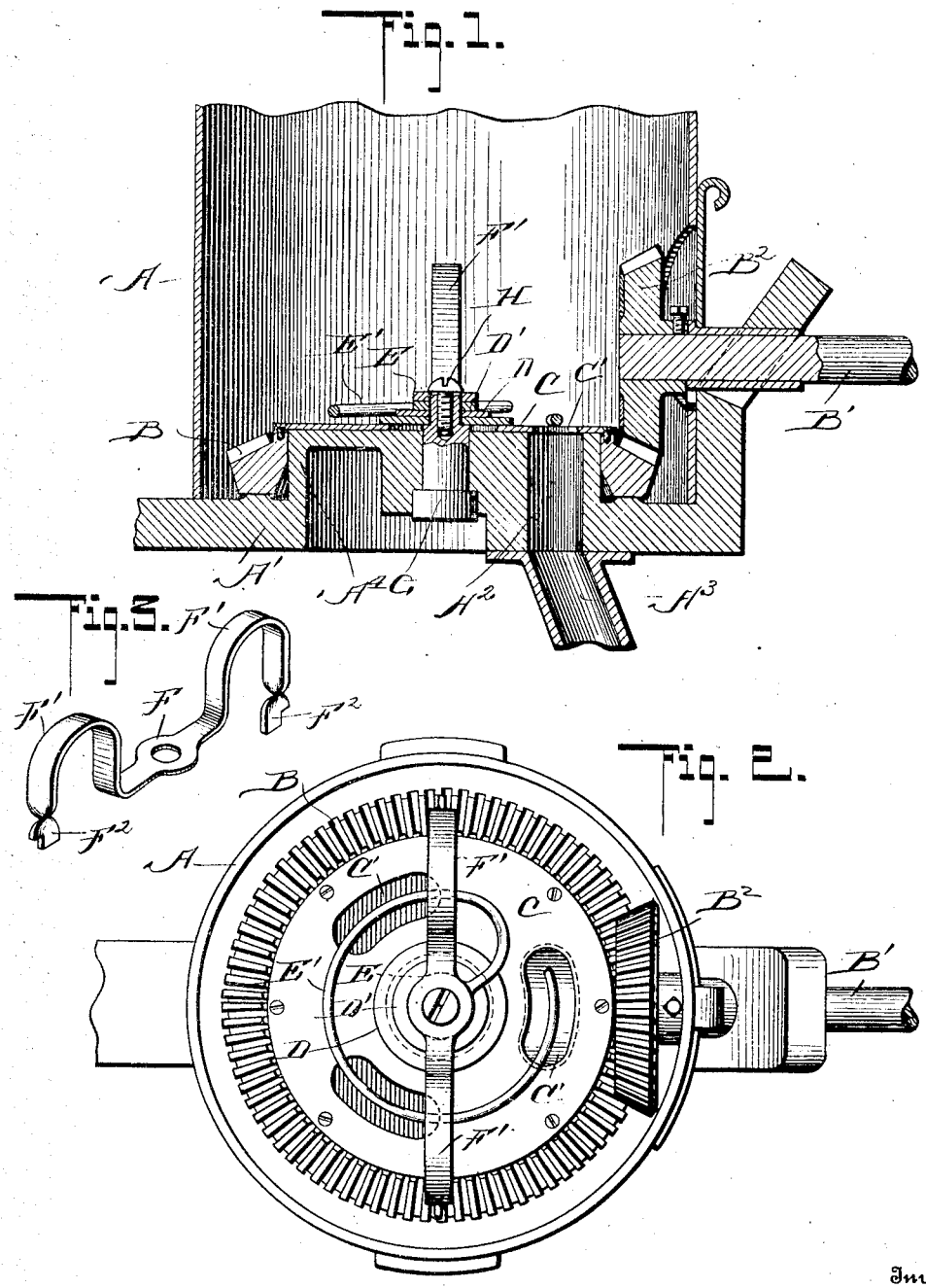
Witnesses
Philip H. Burch
E. B. McBath
Inventors
N. J. Lanotte
F. L. Lanotte
By O'Meara & Brock
Attorneys

UNITED STATES PATENT OFFICE.

NICHOLAS J. LANOTTE AND FRANK L. LANOTTE, OF GRAND PRAIRIE, TEXAS.

PEANUT-PLANTER.

No. 892,745.  Specification of Letters Patent.  Patented July 7, 1908.

Application filed October 29, 1907. Serial No. 399,687.

*To all whom it may concern:*

Be it known that we, NICHOLAS J. LA-NOTTE and FRANK L. LANOTTE, citizens of the United States, residing in Grand Prairie, in the county of Dallas and State of Texas, have invented a new and useful Improvement in Peanut-Planters, of which the following is a specification.

This invention relates to attachments for planters, the object of said attachments being to adapt the planter for the planting of peanuts.

By slight changes in the size the attachment can be used with almost any of the ordinary form of planters, now in use.

The invention consists of the parts, hereinafter fully described, pointed out in the claims, and shown in the drawings, in which:

Figure 1 is a sectional view through the seed box of a planter showing our attachment in position. Fig. 2 is a plan view of the seed box with our parts shown in plan view. Fig. 3 is a detail perspective view of one of the parts detached from the planter.

In these drawings A represents a seed box provided with a bottom $A'$ and a discharge opening $A^2$ which communicates with a discharge pipe $A^3$. The central portion of the bottom is raised as shown at $A^4$ to form a bearing for a beveled gear B and a shaft $B'$ driven in any desired manner is provided with a beveled gear $B^2$ meshing with the beveled gear B.

All of the parts above mentioned are part of the regular planter, and already in use. Our attachment consists of a circular disk C which rotates in a horizontal plane upon the raised portion of the bottom, extending slightly beyond the same so as to overlap the gear B to which it is secured in any desired manner. The disk C is provided with a plurality of openings $C'$ oval in outline, the longitudinal axis of said openings being concentric with the disk and these openings are successively brought into alinement with the discharge opening $A^2$ of the bottom A. These openings may be increased or reduced in size according to the variety of the peanut to be planted.

Washers D and $D'$ are placed upon the disk C in the order named, the washer $D'$ being of smaller diameter than the washer D and upon the washer $D'$ is fitted a small disk E from which extends a convolute spring $E'$, the free end of which extends above the discharge opening $A^2$. Upon this last mentioned disk is placed a plate F from the ends of which rise two U-shaped members, the free end portions of which are given a half-twist and rests immediately above the teeth of the beveled gear wheel B. All of these parts are held into position by a pin G which extends upwardly through the raised portion $A^4$ and forms a shaft upon which the various attachments are fitted, the disk C fitting loosely upon said pin.

A screw H works downwardly in the upper end of the pin and secures the plate F in position which in turn holds the other parts together. As the disk C revolves the opening $C'$ will register with the discharge opening $A^2$ and the peanuts will be fed one at a time, this feeding action being aided by the end portion of the spring $E'$. The twisted portions $F^2$ of the members F will prevent any of the peanuts from circling around within the seed box riding upon the gear-teeth, the said portions $F^2$ acting as guards for checking such circular movement.

What we claim as new is:—

1. The combination with a planter, of a rotatable disk having openings therein, a convolute spring arranged above the disk, and a plate having U-shaped members, the free ends of said members being twisted, as and for the purpose set forth.

2. The combination with a planter having a beveled gear-wheel arranged in the bottom of a seed box, said bottom having a discharge opening, of a rotatable disk rotatably held upon said bottom, said disk being secured to the gear wheel and having openings registering with the opening in the bottom, and guards overhanging the gear-wheel upon opposite sides, as and for the purpose set forth.

3. The combination with the seed box of a planter, and a gear wheel rotating therein, of a disk having discharge openings therein and secured to said gear wheel, a convolute spring secured at one end above the center of the disk, said spring being fixed and its free end being in the path of the discharge openings, a plate secured above the disk and having U-shaped members rising from its ends, the free ends of said members being twisted and overhanging the gear-teeth.

4. In a device of the kind described, a seed box, said box having a discharge opening, a rotatable gear, a disk detachably secured to said gear having a plurality of longitudinal openings adapted to register with the discharge opening in the bottom of the seed box, a convolute spring secured at one end above the center of the disk and having its free end
5 resting above the discharge opening, and a plate secured centrally in the seed box and carrying at opposite ends U-shaped members, said members arching over the disk and their free ends overhanging the beveled gear.

NICHOLAS J. LANOTTE.
    FRANK L. LANOTTE.

Witnesses:
 BRYANT BARRY,
 C. L. CLARK.